United States Patent [19]

Beukema et al.

[11] Patent Number: 5,146,605

[45] Date of Patent: Sep. 8, 1992

[54] DIRECT CONTROL FACILITY FOR MULTIPROCESSOR NETWORK

[75] Inventors: Bruce L. Beukema, Hayfield; David W. Marquart; Ronald D. Morse, both of Rochester, all of Minn.

[73] Assignee: International Business Machines Corporation, Armonk, N.Y.

[21] Appl. No.: 644,799

[22] Filed: Jan. 23, 1991

Related U.S. Application Data

[63] Continuation of Ser. No. 119,758, Nov. 12, 1987, abandoned.

[51] Int. Cl.[5] ............................................. G06F 9/00
[52] U.S. Cl. .................................... 395/575; 371/18; 364/DIG. 1; 364/221; 364/229; 364/229.2
[58] Field of Search .................... 371/16.1, 17, 18; 364/200 MS File, 900 MS File

[56] References Cited

U.S. PATENT DOCUMENTS

| | | | |
|---|---|---|---|
| 3,879,712 | 4/1975 | Edge et al. | 340/172.5 |
| 4,212,059 | 7/1980 | Sato et al. | 371/18 |
| 4,322,793 | 3/1982 | Anderrson et al. | 364/200 |
| 4,328,543 | 5/1982 | Brickman et al. | 364/200 |
| 4,404,628 | 9/1983 | Angelo | 364/200 |
| 4,412,285 | 10/1983 | Neches et al. | 364/200 |
| 4,424,576 | 1/1984 | Lange et al. | 371/18 |
| 4,456,956 | 6/1984 | El-Gohary et al. | 364/200 |
| 4,482,953 | 11/1984 | Burke | 364/200 |
| 4,485,472 | 11/1984 | Sproull et al. | 371/18 |
| 4,511,968 | 4/1985 | Fencsik et al. | 364/200 |
| 4,511,969 | 4/1985 | Koenig et al. | 364/200 |
| 4,589,068 | 5/1986 | Heinen, Jr. | 364/200 |
| 4,604,746 | 8/1986 | Blum | 371/18 |
| 4,606,024 | 8/1986 | Glass et al. | 371/18 |
| 4,703,446 | 10/1987 | Momose | 371/16.1 |
| 4,876,645 | 10/1989 | Shioya et al. | 371/18 |

Primary Examiner—Michael R. Fleming
Assistant Examiner—Debra A. Chun
Attorney, Agent, or Firm—Bradley A. Forrest; Roy W. Truelson

[57] ABSTRACT

Control panel function is provided to bus units coupled together by an I/O bus. At least one bus unit has the capability to issue control commands through the bus to one or more other bus units. A control facility is integrated into bus units, and makes full use of existing paths to processor registers and main storage. Control commands are distinguished from other bus communications, and executed by the control facility, to provide a full control panel function for each bus unit incorporating the control facility.

25 Claims, 7 Drawing Sheets

DIRECT CONTROL FACILITY FOR MULTIPROCESSOR NETWORK

This application is a continuation of application Ser. No. 07/119758 filed Nov. 12, 1987 now abandoned.

BACKGROUND OF THE INVENTION

The invention relates to control of processors, and in particular to the provision of a standard interface for controlling multiple processors coupled together.

Control panels are used to provide an operator diagnostic capability to a processor. They permit a user to directly access processor registers and main storage in a processor, bypassing layers of processor software which could be faulty. Early control panels consisted of switches which were settable by an operator. Registers could be set by use of the switches, and their contents were represented by lights usually residing on a physical side or panel of the computer. More recent versions of control panels have included a service processor directly attached to a processor and its main storage. The service processor is then controlled by a typewriter keyboard, which may invoke programs in the service processor, to read and write register contents and main store data. Each processor is usually provided with its own control panel, if it has one at al. This results in much duplication of circuitry, since both I/O buses and the control panel have separate paths to main storage. Limited paths have also been provided to some registers through I/O buses.

U.S. Pat. No. 3,879,712 to Edge et al. describes a diagnostic interface attached to each processor. Each interface is also attached to a bus, and appears as a separate device from the processor it is attached to. The diagnostic interface is used by another processor to provide access to the processor the interface is attached to for running diagnostic routines. The interface provides access to some of the internal registers. One problem with this type of interface is that many I/O buses have a limited number of addresses available or a limited electrical load capacity. It severely limits the number of processors with diagnostic interfaces which could be coupled on an I/O bus. The interface provides only limited access to control registers, and thus does not provide a full control panel function. It is also separate from the I/O interface, and thus would require the above-mentioned duplication of circuitry.

SUMMARY OF THE INVENTION

Control panel function is provided through a processor's I/O attachment interface by the addition of a facility responsive to control panel commands. Control panel commands are intercepted by the control panel facility from communications on the I/O path to the processor, while normal bus communications go on to the processor. When a control panel command is detected, the command is executed by the facility using existing and added paths to the processor registers and main storage to read and write. The control panel facility is preferably embedded in each processor attached to the bus, and any unit attached to the bus may serve as a control panel, providing control panel commands. By extensive use of existing paths to registers and main storage, little hardware is required to add the facility to existing processors.

The invention provides full control panel function using the existing paths in a processor from its connection to an I/O bus. No extra connections to the I/O bus are required, thus permitting full utilization of the bus capacity for processors and I/O devices. Since the facility passes on normal communications and only intercepts control panel commands, the facility need not be removed or disabled when control panel functions are not being performed.

The control panel commands may be issued by any other processor attached to the bus which has the capability to issue the commands. A user at a workstation attached to a workstation controller which is attached to the bus can invoke a diagnostic utility running on a processor, which issues control commands to another processor. Or, the user may issue the commands directly from the workstation.

Great flexibility is thus achieved with little added cost. Since only one processor need be capable of issuing control commands for all the processors attached to the bus, there is no needed duplication of control panel function. Further flexibility is obtained in that control panel commands do not need to take complete control of a processor attached to the bus. Other commands received by a processor following a control command are processed as normal, unless the control command intentionally stopped the processor. There is no requirement or burden of switching modes of operation in order to provide the function.

Further benefits will become apparent after reading the detailed description.

DETAILED DESCRIPTION

Figure 1:
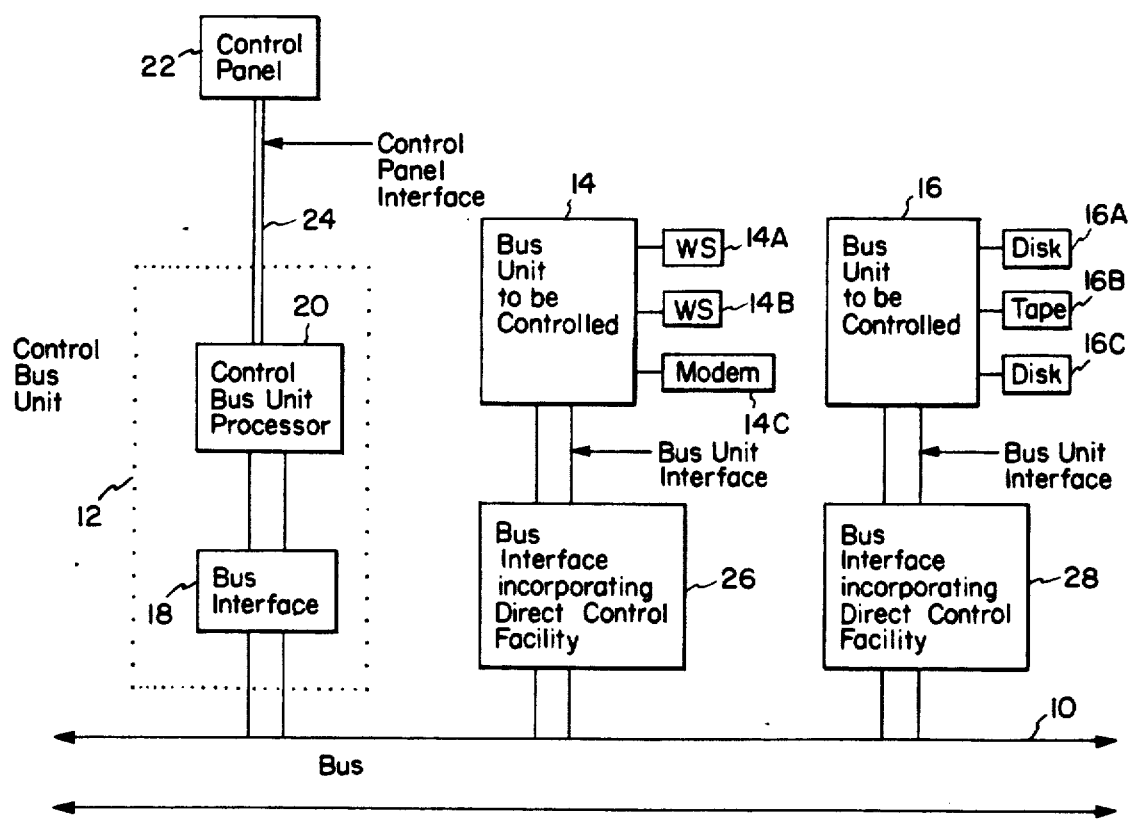
FIG. 1 is a block diagram of a bus with several bus units incorporating a direct control facility.

In FIG. 1, a bus 10 is shown with several bus units, 12, 14, and 16 attached. Bus 10 is an I/O (input/output) bus, which is used to pass data between the bus units. The bus units are a mix of processors, including I/O controllers for controlling direct access storage devices 16A, 16C, communication devices and many other secondary storage devices such as tape drive 16B. The communication devices usually include workstations 14A, 14B and devices for providing access to external communication medium, such as modem 14C.

Bus unit 12 is coupled to bus 10 by a bus interface 18. Bus interface 18 performs functions required to attach bus unit 12 to the bus. Such functions include arbitration for obtaining control of the bus, and data manipulations to match data protocols of the bus unit 12 to the bus.

Bus interface 18 attaches a control bus unit processor 20 to the bus. Processor 20 is in turn coupled to a control panel 22 via a control panel interface 24. Processor 20 processes commands from the control panel 22, which are then communicated to the other bus units 14 and 16 over bus 10. Bus units 14 and 16 also have similar bus interface adapters 26 and 28 to perform arbitration and protocol matching between the units and the bus. In addition, the bus interface adapters 26 and 28 have a direct access control facility built into them to recognize control panel commands directed to their respective bus units.

Control panel 22 is a user interface in the preferred embodiment, consisting of a personal computer with typewriter keyboard interface and a display. Other user interface such as physical switches may also be used. It provides a user with a standard control panel capability to read and write registers and main storage of any of the bus units which incorporate the direct access control facility. The above capabilities are usually used by programs running on control bus unit processor 20, after being invoked by the user via control panel 22. The bus interface 18 of the control bus unit 12 may also incorporate the direct access control facility, and be controlled by any other processor attached to the bus which has control panel capability.

The direct access control facility allows diagnostic control of processors on a bus where the processors do not have control panels for determining the cause of hardware and software failures. The facility is preferably implemented in hardware so that no software need be running on the bus unit in order to access processor registers or storage. The intent is to supply a capability similar to prior system control panels, capable of reading and changing processor registers and storage, and having control capabilities to retrieve status and to control processor functions such as resets and execution control.

The facility has a variety of uses, including hardware and software debug, status retrieval after a software failure in a co-processor, diagnosis of hardware failures without removing hardware, initial program load, hardware initialization and testing coincident with normal processing. One can stop a processor by simply writing an appropriate value into a known register. The contents of the remaining registers are then read via commands, and their contents can be used to debug software programs.

Figure 2:
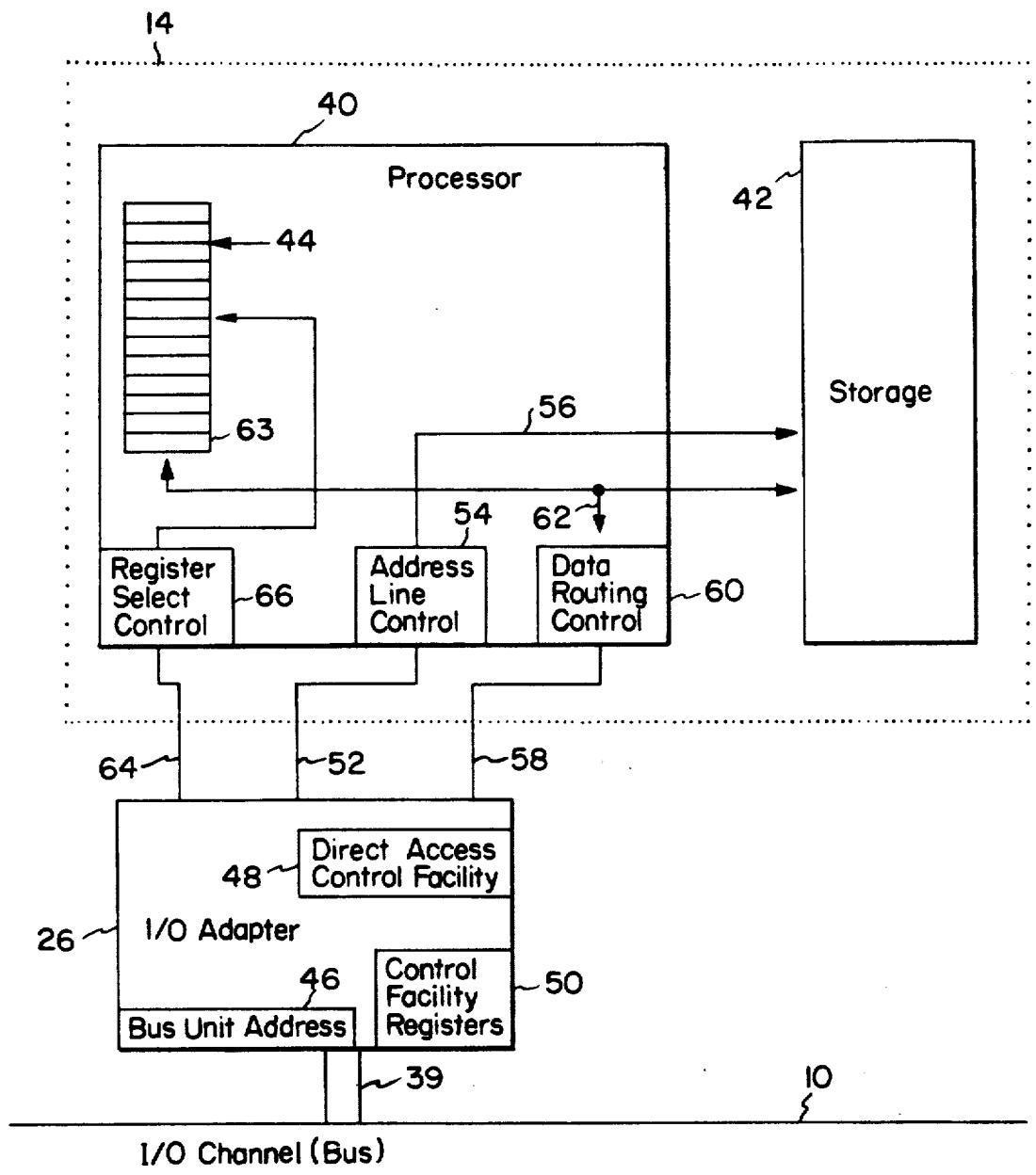
FIG. 2 is a detailed block diagram of a direct control facility as incorporated into a bus unit.

In FIG. 2, wherein the numbering is consistent with FIG. 1, bus unit 14 is shown attached to bus 10 through bus interface adapter 26 and a connection 39. Bus unit 14 comprises a processor 40 coupled to a main storage device 42. Processor 40 contains registers identified at 44 which consist of general purpose registers, addressing registers, control registers, and other assorted registers which in prior systems would have been accessible via a control panel to control processor 40.

Bus interface adapter 26 contains a bus unit address 46, which is a register containing the I/O address of the bus unit, and is used by the bus interface adapter 26 in obtaining access to the bus and determining when a communication from another unit is intended for it. The bus interface adapter 26 further includes a direct access control facility 48 which monitors bus communications for control panel commands which are intended for bus unit 14. Information transmitted across bus 10 has a tag associated with it which identifies the type of information that it is. In one preferred embodiment, the tag is transmitted on address lines, but may equally well be imbedded in the command itself. Separate bus lines could also be used to indicate the commands. Control panel commands are indicated by such a tag, and are routed to control facility 48. No action is taken by I/O adapter 26 unless requested by control facility 48.

The direct access control facility 48 has access to a number of control facility registers 50 which are used by it to buffer data between bus unit 14 and the bus 10. The direct access control facility 48 has access to some registers 44, and most of main storage 42 through many lines and logic which were already in existence prior to implementation of the direct access control facility 48. The I/O adapter 26, through implementation of direct memory access to main storage 42 had read and write access to most locations in main storage 42. A line or lines 52 from I/O adapter 26 to address line control logic in processor 40 provides addressing control on a line 56 to main storage 42. Further, a line 58 provides for the transfer of data from I/O adapter 26 through data routing and control block 60, over a line 62 to main storage 42.

The main purpose of such lines in prior I/O adapters was to provide for transfer of data between storage devices attached to the bus 10 and the processor main storage 42 without intervention of the processing activities of processor 40, a standard direct memory access (DMA) capability. Some prior I/O adapters further provided a line 64 coupled to a register select control block 66. Register select control block 66 provided read and write access to some of the control registers 44. Data was written and read via the data routing control block 60 via line 62 which was also coupled to the registers.

The direct access control facility 48, while indicated as a discrete block, is integrated into the I/O adapter 26 and partially into the processor 40, in the form of a more complete set of access connections to further registers 44, to provide a complete control panel function. Further, a control facility status register included in control registers 44 has been added to the bus unit 14. The status register, while not required, is useful for providing the status of operations. It is preferably exclusively settable by bus unit 14 to give an accurate representation of the status of selected operations.

The status register indicated with registers 44 is assigned the following values in the preferred embodiment:

| Bit | Value | Meaning |
| --- | --- | --- |
| 1 | 0 | No error occurred on the last direct control facility operation to this bus unit. |
| 1 | 1 | An error did occur on the last direct control facility operation to this bus unit. |
| 2 | 0 | The processor in this bus unit is not running, or there is no processor in this bus unit. |
| 2 | 1 | The processor in this bus unit is running. |
| 3 | 0 | This bus unit does not have a check condition. |
| 3 | 1 | This bus unit has a check condition. |
| 4 | 0 | This bus unit is not stopped due to an error. |
| 4 | 1 | This bus unit is stopped due to an error. |

| Bit | Value | Meaning |
| --- | --- | --- |
| 5-15 | | Reserved. |
| 16-31 | | Defined by each bus unit. |

Bits 16 through 31 are defined by each bus unit and may contain information that the bus unit designers desire. This information is selected to show the status of the bus unit and reduce the number of direct control facility operations needed for the controller to determine that target bus unit's status. The status register 44 is not loadable. The status values are read registers, or are the outputs of any arbitrary logic function.

Figure 3:
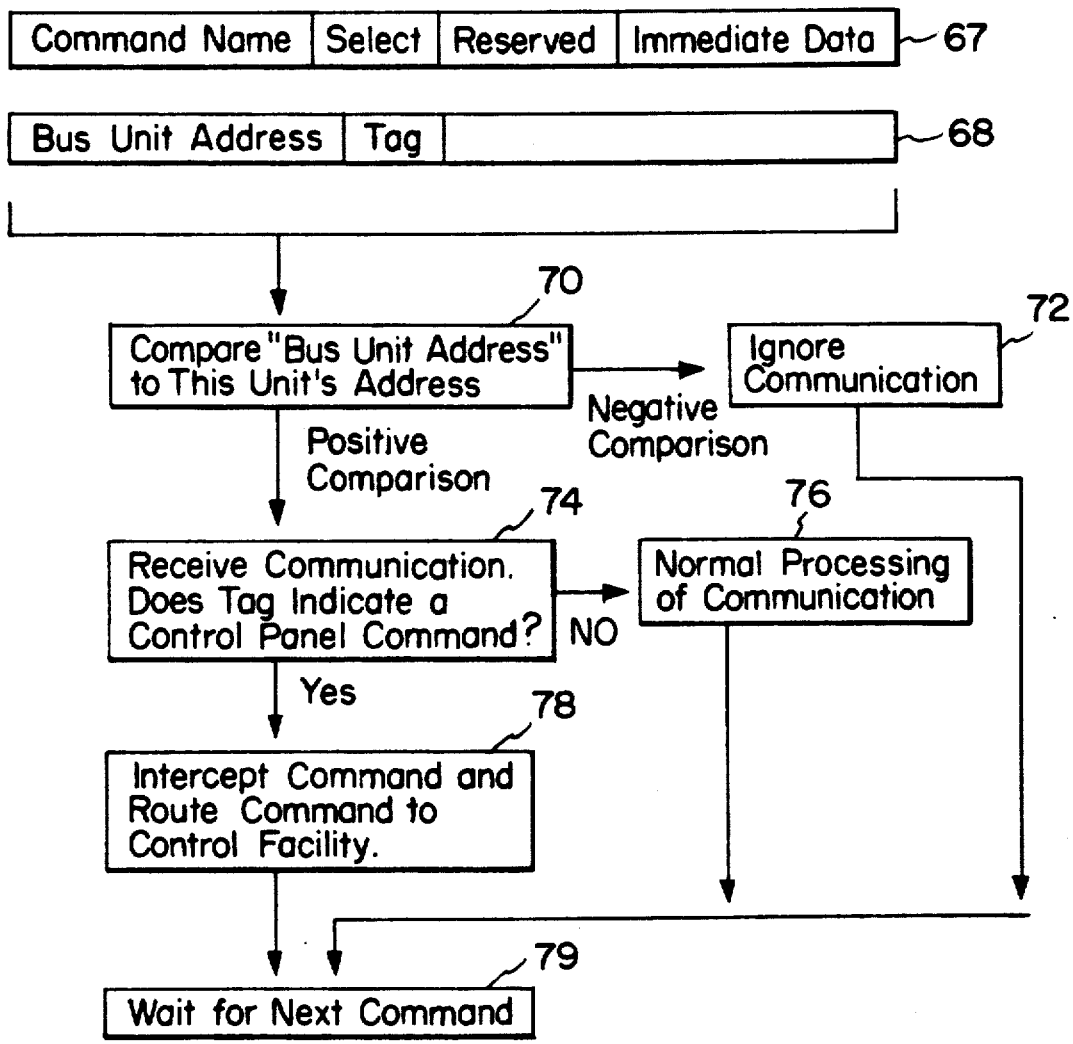
FIG. 3 is a flow diagram of the handling and routing of bus communications.

In FIG. 3, a command is indicated at 67 in block form. It comprises a command name, a select field, a reserved field, and an immediate data field. These fields are discussed in further detail below. Further information on bus 10 is indicated at 68, including the bus unit address the communication is intended for, and the tag which identifies the type of communication, such as a direct memory access, standard read or write commands, or control panel commands.

I/O adapter 26 comprises the bus unit address at 70 and ignores the communication at 72 if the address does not match its own address. If there is a positive comparison, the communication 67 and 68 is received, and the tag is inspected at 74. The tag identifies the type of communication for normal processing by the I/O adapter 26 and bus unit 14 at 76, or indicates that it is a control command which is routed to the control facility 48 at block 78. In block 79, the next command is waited for. In one embodiment, processing of one command by the bus unit is completed prior to another command being sent. In another embodiment, commands are queued and block 79 actively waits for the next command for queuing, immediately after the bus unit address is compared at block 70 for a prior communication.

Figure 4:
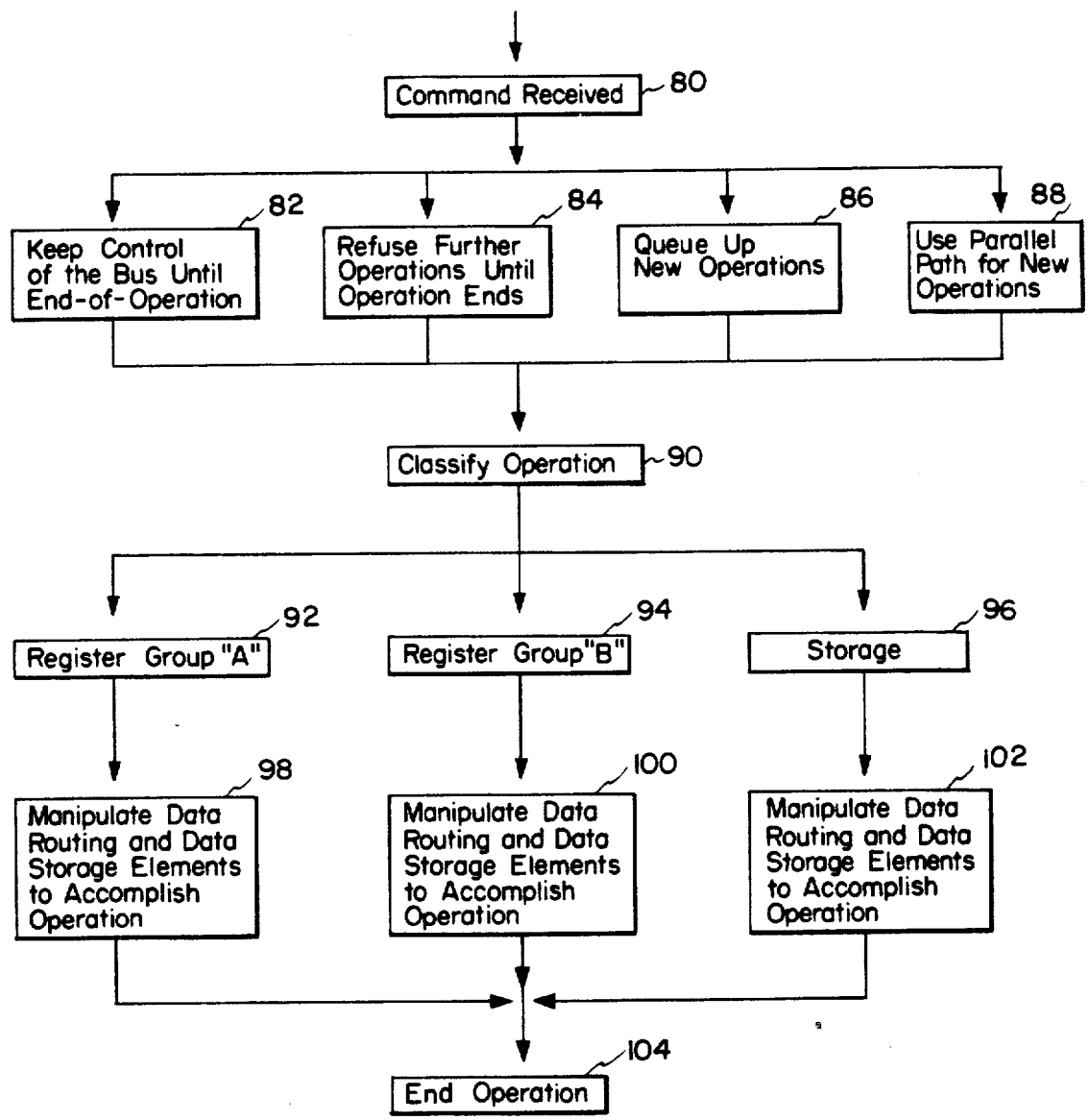
FIG. 4 is a flow diagram of the handing of control command by the control facility of FIG. 2.

The operation of the control facility 48 is shown in further detail in block flow form in FIG. 4. The command is received from block 78 at 80. Upon receipt of the command, the I/O adapter is prevented from processing further information received from the bus 10 in one of many ways as indicated at blocks 82, 84, 86 and 88. The exact way chosen is dependent on the characteristics of the bus 10 and I/O adapter of the system in which the invention is implemented.

At 90, the operation identified in the command is classified into which processor or facility in the bus unit that it pertains to, and which set of registers and or storage it affects at 92, 94 and 96. Note that there are only three possibilities shown, but many more than three are possible. The three shown are for one processor or facility, having at least two different groups of registers, A and B as indicated at 92 and 94, and at least one main storage unit as indicated at 96. At this point, the control facility manipulates data routing, control and data storage elements to accomplish the operation at 98, 100 and 102. Use is made of the existing paths in FIG. 2, such as path 64 from the I/O adapter 26 to register select control panel 66, path 52 to address line control 54 and path 58 to data routing control 60. As previously mentioned, the paths from the control blocks 66, 54 and 60 are enhanced to provide complete access as required to perform equivalent control panel function. Since many of the paths already existed, little cost is associated with the implementation of the complete control panel function provided by the invention.

Finally, the operation is ended at 104. The active operation at 82, 84, 86, or 88 which held the I/O adapter 26 at bay until completion of the operation is no longer active. The I/O adapter 26 is thus ready to process further information in FIG. 3.

A generic panel command set is now set forth. The command set actually implemented is dependent on the type of bus unit for which a control panel is desired. The direct access control facility is preferably implemented in hardware so that no software is required to be loaded and operational in the bus unit for the facility to operate.

A Stop command may stop the entire bus unit or part of the bus unit.

A Start command may start the entire bus unit or part of the bus unit.

A Read command will read any entity in the bus unit, be it a register or a main storage location, both of which are specified by unique addresses.

A Write command will write any storage location in the bus unit.

A Load command will cause a command to be loaded in the direct control facility of the specified bus unit.

A Load Data command will load selected data in the direct control facility of the specified bus unit.

An Execute Previously Loaded command will cause a previously loaded command to be executed.

Further specialized commands may be provided for to perform bus unit specific functions.

The bus units and bus may allow for highly functional commands such as read or write any storage location or register, or it may be limited to loading or retrieving a few registers 50 in the I/O adapter 26 which are associated with the direct access control facility 48. In the case of the latter, the command set allows for the loading and retrieving of these registers 50 and for instructing the direct access control facility 48 to execute commands based on the values of these registers. One example is to read a storage location into a direct control facility register 50, taking the address from another direct control facility register 50. The direct control facility requires both read and write access to registers, storage, and control facilities 54, 60, and 66 in the bus unit. This access need not be via a single command. To minimize hardware, it may take several commands to examine or change entities within the bus unit.

In addition to control panel 22 in FIG. 1 providing a user interface for causing bus unit 12 to issue control commands to bus unit 14 or 16, other bus units may issue a control command to another bus unit. In one embodiment, bus unit 14 is a workstation controller. A user at one of the attached workstations 14A or 14B could invoke a program running on bus unit 12 which issues control commands to bus unit 16. Further, the user could cause the commands to be issued from bus unit 16 intended for bus unit 12, assuming bus unit 12 incorporates the direct control facility 48.

Figure 5:
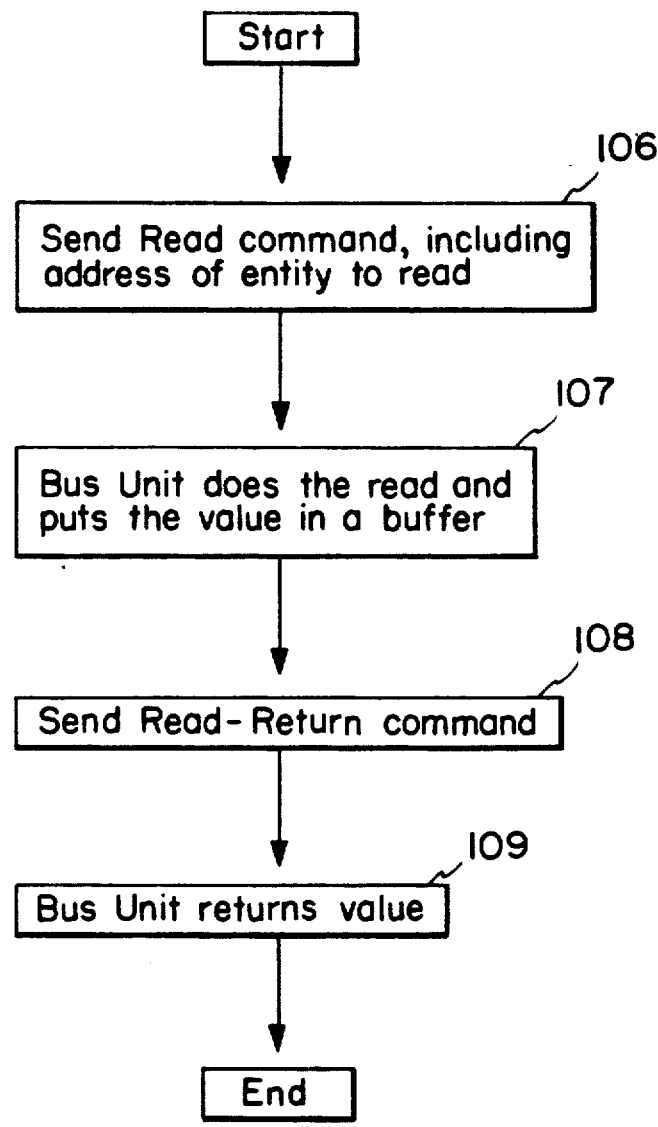
FIG. 5 is a flow diagram of a write operation performed by the direct control facility of FIG. 2.
Figure 6:
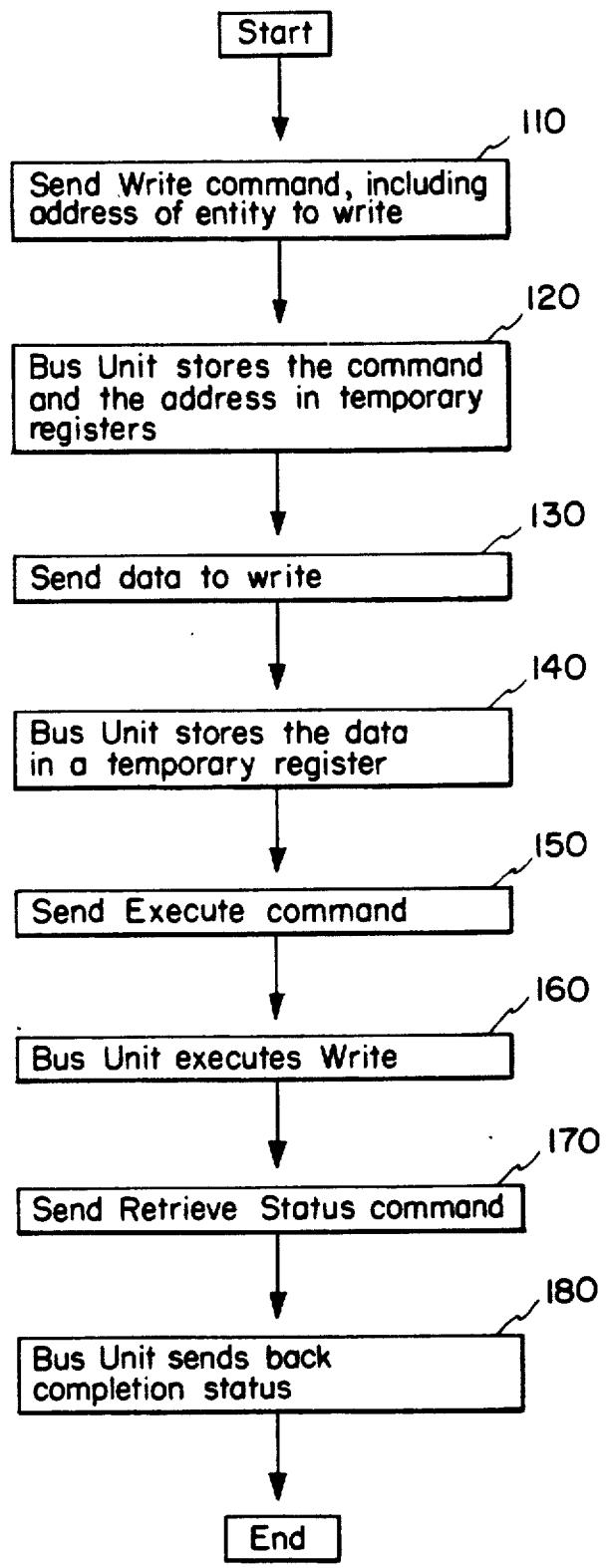
FIG. 6 is a flow diagram of a write operation performed by the direct control facility of FIG. 2.
Figure 7:
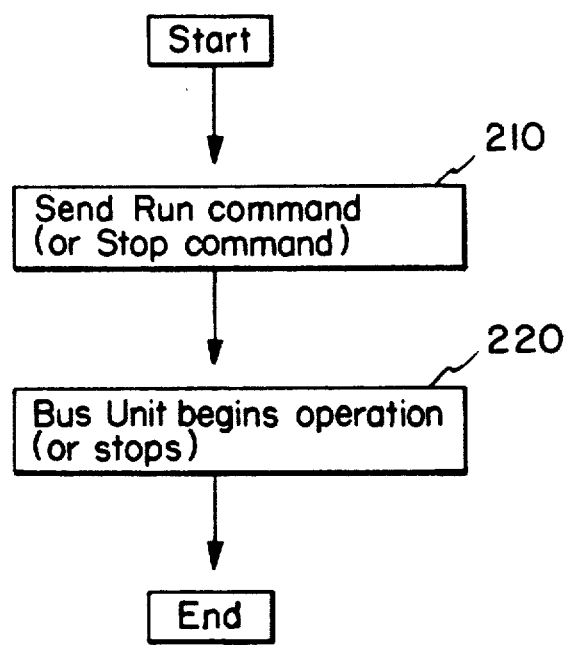
FIG. 7 is a flow diagram of Run and Stop operations performed by the direct control facility of FIG. 2.

Examples of flows of operations for the direct access control facility 48 are shown in FIGS. 5, 6 and 7. The flows assume fairly severe hardware restrictions. On a system with fewer restrictions, many of the operations could be combined. For example, a read from a single location could be one operation and response.

In FIG. 5, flow for a Read command is shown. Reads may be done directly from storage or register, or from direct access control facility registers 50. The format of commands in general, and examples of the commands are described further on in this description.

The Read command is initiated in block 106 by the control panel 22 and control bus unit processor 20 from FIG. 1. Bus interface unit 18 obtains control of the bus 10, formats the command, and transmits the command on bus 10 with an address corresponding to the desired bus unit. The Read command contains an address of one of the registers 44 or storage location of main storage 42 in FIG. 2. If the Read command is intended for storage unit 14, the bus interface adapter 26 recognizes its address in the command, and takes the command from the bus 10. The direct access control facility 48 recognizes the command as a control panel command, and processes it. Direct access control facility 48 then uses control blocks 54, 60, and 64 to read the register or main storage location specified in the command, and puts the value in a buffer, or control facility register 50, as indicated in the flow diagram at 107. In a further embodiment, the Read command may be a different command from a Read Register command to avoid assigning storage addresses to registers. The control bus unit 12 then sends a Read-Return command at 108, which the direct access control facility 48 again recognizes as a control panel command, processes the command, and returns the value which it has stored in one of the control facility registers 50 as indicated at block 109. The value of the status register written by the host unit is then returned.

It is apparent that the separation of the process of reading storage into multiple commands is both dependent on the characteristics of the I/O bus 10 and the complexity of the control facility 48 logic. Reading could be implemented in a single command, with data sent directly back to the processor issuing the Read command.

A flow for a Write command is shown in FIG. 6. The command specifies the action that a control facility is to take. It may be a storage or register access, or a processor control action such as STOP, RESET, or START. The first data word of write commands is an address to be used by the command, if the command requires an address. Otherwise the first data word is ignored. The second data word of write commands is data to be used by the command, if the command requires data. Given a wide bus, the data words could easily be sent together rather than multiplexed.

A write command is sent from the control bus unit as indicated at block 110. The write command is sent on the bus 10 with an address indicating the desired bus unit. At 120, the bus unit the command is intended for stores the command and the address in registers 50. The data to be written is then sent at 130 and at 140, it is stored in a register 50. At 150, an Execute command is sent to the bus unit and intercepted by the direct access control facility at that unit. At 160, the direct access control facility executes the command, sending the data in the register 50 to the register or storage location stored in registers 50. Status of the write is stored in the status register 63. The control bus unit then sends a Retrieve Status command at 170 which causes a read of the status register, and return of the status of the write on the bus at 180. Again, given a different implementation of bus 10 and control facility 48, a write operation could be accomplished much more efficiently.

In FIG. 7, a flow diagram is used to represent both the Stop and the Run commands. At 210, the Run or Stop command is generated by the bus control unit and sent to a desired bus unit. At 220, the appropriate I/O adapter accepts the command, and its direct access control facility 48 recognizes it as a control panel command, and executes it, causing the bus unit to begin or stop operation. The control panel does this by loading an addressable register in registers 44 that the control panel function may load with "go" or "stop" values—the register controls the run/stop logic of the bus unit. In a further embodiment, unique commands like "go" and "stop" interact with control logic instead of registers to start and stop the bus unit.

One feature of the present invention is that control panel commands need not completely stop a bus unit from processing other commands and data. The control commands are treated like other commands, and executed. Unless one of the control commands stops the intended processor, other commands continue to execute. If the I/O unit queues bus commands, control commands may be given any desired priority. A direct memory access (DMA) operation may occur directly following a control command. It is likely more efficient to obtain main store data with a DMA operation than by use of multiple control commands. If DMA is not available, then control commands could be used.

The command format, and several basic commands are now defined. Since the direct access control facility is a low level interface and varies between processors, few of the commands are specified completely. Others are defined which are usable by bus unit designers if they fit with the bus unit. The command word format is preferably as follows:

| Bits | Description |
| --- | --- |
| 0–7 | Command name |
| 8–11 | Processor Select |
| 12–15 | Reserved |
| 16–31 | Immediate Data |

Bits 0–7 contain an identification of the command. Several will be given with command definitions which follow.

The processor select field of bits 8–11 is used to select which processor or other facility on the bus unit to direct the command to. The value '0000' is used by some commands to mean all processors. Each bus unit assigns four-bit identifiers to the processors or facilities on the bus unit that commands must be able to treat separately as indicated at 90 in FIG. 4. Bus units may also define groups of processors and facilities which will all be selected for particular values of this field.

The immediate data field comprising bits 16 through 31 is used by bus unit defined commands as an extension of the command or as an immediate data field or address.

Commands are defined in the following text. Commands marked with an "*" are required in the preferred embodiment. Others are optional, but desired. If special commands or sequences of commands are required to access storage or registers in a bus unit, the bus unit implements its own command or commands to allow such access. They do not use the commands defined below, unless some storage or registers may be accessed through the commands defined below.

STOP BUS UNIT PROCESSOR* HEX "01"

The Stop Bus Unit Processor command is identified as X'01', which is a representation of hexadecimal "01", which takes eight binary bits to represent. This command stops the processor(s) on the bus unit. The direct access control facility 48 uses the processor select field of the command to select which processor or facility to stop, if there is more than one processor or facility; otherwise it ignores the processor select field. If there are multiple processors on the target bus unit and processor select is '0000', STOP stops all processors and facilities. If the processor select field is a group of processors and facilities. STOP stops all of the processors and facilities in that group.

START BUS UNIT PROCESSOR* HEX "02"

The Start Bus Unit Processor command starts the processor(s) on the bus unit. The direct access control facility 48 uses the processor select field of the command to select which processor or facility to start, if there is more than one processor or facility; otherwise it ignores the processor select field. If there are multiple processors on the target bus unit and processor select is '0000', START starts all processors and facilities. If the processor select field is a group of processors and facilities, START starts all the processors and facilities in that group.

RESET BUS UNIT PROCESSOR* HEX "03"

The Reset Bus Unit Processor command resets the processor(s) on the bus unit. The direct access control facility 48 uses the processor select field of the command to select which processor or facility to reset, if there is more than one processor or facility; otherwise it ignores the processor select field. If there are multiple processors on the target bus unit and processor select is '0000', RESET rests all processors and facilities. If the processor select field is a group of processors and facilities, RESET resets all of the processors and facilities in that group.

SINGLE STEP BUS UNIT PROCESSOR HEX "04"

This command single-steps a processor or bus unit. The direct access control facility 48 uses the processor select field of the command to select which processor or facility to single step. The processor is first stopped. The processor then executes one instruction and stops again. Registers can then be inspected by other commands, or the next instruction can be stepped through. This command is often used during debug.

WRITE STORAGE HEX "05"

The write storage command writes the second data word of the command into the storage location on the bus unit addressed by the first data word of the command.

The direct access control facility 48 uses the Processor Select field of the command to select which storage on the bus unit to write to if there is more than one processor or facility. Otherwise, it ignores processor select. Write storage works with one storage unit at a time.

WRITE REGISTER HEX "06"

The Write Register command writes a second data word of the command into the register on the bus unit addressed by the first data word of the command. It uses the Processor Select field of the command to select which set of registers on the bus unit to write to if there is more than one processor or facility. Otherwise it ignores the processor select field. Write Register works with one set of registers at a time.

RESERVED COMMANDS* HEX "07" through "3F"

These commands are reserved for further expansion.

BUS UNIT DEPENDENT COMMANDS HEX "40" through "FF"

Command codes X'40' through X'FF' are for each bus unit to define as necessary. Bus unit commands may use the Register Address, Processor Select, and Immediate Data fields in the command and both data words in the unit operation as desired. These commands will likely take extra hardware to execute. They may be selected to perform functions which would normally take several other commands to execute. By using more complex commands, bus bandwidth is conserved because fewer commands need to be transferred. Given the format of the commands, and knowing the correct registers to control via the commands, one can easily generate commands to perform a large variety of functions and control. Using the particular bus access protocols, the commands are sent to desired bus units. A bus unit may be controlled by the commands, and further devices attached to the bus unit may also be controlled. The devices, such as workstations 14A, 14B, and disk drive devices 16A and 16C usually communicate with their respective bus units by means of a register. Since the direct access control facility preferably provides access to all of the registers in the bus unit, some control of the devices themselves may be available without any operational software in the bus unit.

While the invention has been described in terms of one or more preferred embodiments, it will be recognized by those skilled in the art that many variations within the scope of the following claims are possible. The particular bus used greatly influences the resulting command structure which can be used. The greater the capability of the bus, the more complex a command may be. Further, since any device may act as a control panel, or receive control panel commands, a single bus unit need not be dedicated solely to control panel function. A complete control panel function is obtained with a minimum of additional hardware.

What is claimed is:

1. A control facility in a processor for providing control of the processor, said processor being coupled to a bus and having means for receiving and executing data processing commands from said bus, said control facility comprising:
   means coupled to the bus for monitoring communications on the bus intended for the processor, wherein the bus communications comprise data, data processing commands from other processors attached to the bus, and control panel commands;
   identifying means coupled to the monitoring means for identifying the control panel commands;
   intercepting means responsive to the identifying means for intercepting communications consisting of control panel commands intended for the processor;
   control panel command execution means for executing the commands identified by the identifying means; and
   register selection means coupled to the command execution means and the processor for reading and writing registers in the processor as directed by the control panel commands to control the processor directly through the bus.

2. The control facility of claim 1 wherein one of the other processors is a control processor for running programs which generate the control panels commands on the bus.

3. The control facility of claim 1 and further comprising means for accessing a processor main storage unit in accordance with the control panel commands.

4. The control facility of claim 3 wherein a control panel command comprises an address of the main storage unit, and the execution means uses said address to cause the accessing means to access data in the main storage unit at said address.

5. The control facility of claim 4 wherein other processors are coupled to the bus, and the accessing means provides access to the main storage for the other processors requesting access.

6. The control facility of claim 1 wherein the processor comprises a plurality of facilities, and wherein each control panel command has a select field for indicating the facility within the processor that the command pertains to.

7. The control facility of claim 1 wherein the control panel command execution means comprises means for executing a stop command to stop a processor from executing.

8. The control facility of claim 1 wherein the control panel command execution means comprises means for executing a start command to start a processor executing.

9. The control facility of claim 1 wherein the control panel command execution means comprises means for executing a read command for reading an entity in the processor.

10. The control facility of claim 1 wherein the control panel command execution means comprises means for executing a write command for writing to storage locations in the processor.

11. The control facility of claim 1 wherein the control panel command execution means comprises means for loading information into a selected register of the processor.

12. The control facility of claim 11 wherein the control panel command execution means comprises means for causing the processor to execute a previously loaded command.

13. A multiprocessor system comprising:
a plurality of bus units having registers and main storage;
a communications bus coupled to the bus units for transferring data and commands between the bus units;
each bus unit having an adapter for interfacing the bus unit to the communication bus and having paths for directing data on the communication bus from main storage, at least one adapter further having paths to its bus unit registers and having a control facility for identifying and interpreting direct access control commands received over the communication bus for accessing the bus unit registers and main storage using the paths in the bus unit adapter.

14. The multiprocessor system of claim 13 wherein a bus unit comprises multiple processors, each having a control facility, each control facility having paths from its bus unit adapter to control registers, and wherein a direct access control command causes the control facility to access the registers of one processor.

15. The multiprocessor system of claim 14 wherein each direct access control command comprises a field for identifying the processor and facilities the control facility is to access.

16. The multiprocessor system of claim 13 wherein the operation of a bus unit having the control facility is controllable through the control facility by the writing of control commands into the registers.

17. The multiprocessor system of claim 13 wherein at least one of the bus units comprises a control panel facility for generating control commands.

18. The multiprocessor system of claim 17 wherein the control panel facility associates a bus unit address with each generated control command for identifying the bus unit which is the target of the control commands.

19. The multiprocessor system of claim 13 wherein the control facility suspends operation of the bus adapter it resides in until the control facility has completed operations on a control command.

20. The multiprocessor system of claim 13 wherein at least one bus unit further comprises means for distinguishing direct access control commands from other commands and data, and forwarding said direct access control commands to the control facility.

21. A bus unit of a multiprocessor system, said multiprocessor system comprising a plurality of bus units and a communication bus coupled to the bus units for transferring data and commands between the bus units, said bus unit comprising:
a plurality of registers and main storage;
an adapter for interfacing said bus unit to the communication bus; and
paths for directing data on the communication bus to and from said main storage;
said adapter further having paths to said registers and having a control facility for interpreting and identifying direct access control commands received over the communication bus for accessing said registers and main storage using the paths in said adapter.

22. The bus unit of a multiprocessor system of claim 21, wherein said bus unit further comprises multiple processors, each having a control facility, each control facility having paths from said adapter to control registers, and wherein a direct access control command causes the control facility to access the registers of one processor.

23. The bus unit of a multiprocessor system of claim 21, wherein the operation of said bus unit is controllable through said control facility by the writing of control commands into the registers.

24. The bus unit of a multiprocessor system of claim 21, wherein the control facility suspends operation of said adapter until the control facility has completed operations on a control command.

25. The bus unit of a multiprocessor system of claim 21, wherein said bus unit further comprises means for distinguishing direct access control commands from other commands and data, and forwarding said direct access control commands to the control facility.

* * * * *